United States Patent [19]

Jeon

[11] Patent Number: 5,420,490
[45] Date of Patent: May 30, 1995

[54] APPARATUS AND METHOD FOR COMPENSATING FOR WARM-UP DRIFT IN A SERVO MOTOR

[75] Inventor: Jae W. Jeon, Suwon, Rep. of Korea
[73] Assignee: Samsung Electronics Co., Ltd., Suwon, Rep. of Korea
[21] Appl. No.: 120,753
[22] Filed: Sep. 15, 1993

[30] Foreign Application Priority Data

Sep. 18, 1992 [KR] Rep. of Korea .................. 92-17061

[51] Int. Cl.⁶ ........................................... G05D 23/275
[52] U.S. Cl. ..................................... 318/632; 318/634; 318/635; 318/626
[58] Field of Search ............... 318/632, 634, 635, 626, 318/610

[56] References Cited

U.S. PATENT DOCUMENTS

| | | | |
|---|---|---|---|
| 4,533,858 | 8/1985 | Tlaker | 318/634 |
| 4,587,883 | 5/1986 | Ehrentraut et al. | 318/632 |
| 4,668,157 | 5/1987 | Kato et al. | 318/632 |
| 5,119,003 | 6/1992 | Lin et al. | 318/632 |

FOREIGN PATENT DOCUMENTS

1-205988  8/1989  Japan .

Primary Examiner—William M. Shoop, Jr.
Assistant Examiner—Karen Masih
Attorney, Agent, or Firm—Burns, Doane, Swecker & Mathis

[57] ABSTRACT

A register stores the value from the integral controller of the PID controller whenever it receives a feedback signal. A main controller outputs a warm-up drift compensation value whenever the servo motor is at a standstill. An arithmetic unit calculates the sum of the speed command signal from the PID controller, the warm-up drift compensation value from the main controller and a speed feedback signal and applies the result to the servo motor. In order to compensate for the warm-up drift in the servo motor, the main controller controls the position control apparatus by resetting the warm-up drift compensation value as described above.

9 Claims, 6 Drawing Sheets

APPARATUS AND METHOD FOR COMPENSATING FOR WARM-UP DRIFT IN A SERVO MOTOR

BACKGROUND OF THE INVENTION

This invention relates to an apparatus and a method for compensating for warm-up drift produced during the start-up phase of a position control apparatus.

An apparatus for controlling the position is initially driven by a rotating servo motor which is initially at a low a temperature. As a result of the continuous rotation of the servo motor, the servo motor generates thermal energy. A characteristic of one element (for example, a transistor) of the apparatus is subject to change (caused by a warm-up drift) which can cause an error in the rotation speed. In the particular, an error which exceeds the maximum permissible limits is generated due to the warm-up drift caused by the temperature change.

In order to solve these problems, the prior art discloses that (1) an initial drift compensation value is set at zero, (2) when a difference between a specific destination position and the present position exists within the maximum permissible limits every time the motor moves, the previous setting value will be repeatedly used and (3) if a difference between a specific destination position and the present position exists beyond the maximum permissible limits, the drift compensation value should be re-established.

Because such a prior art method for compensating for warm-up drift does not establish a new compensating value if the difference between the destination position and the present position is within the maximum permissible limits, the fluctuations will be within the permissible limits but will vary over time due to the initial warm-up drift.

In order to achieve a more efficient operation, until the apparatus controlling position can be more stabilized, a supplementary operation is needed at the initial start-up phase. A typical prior art for suppressing drift in a servo motor is disclosed at Japanese Laid Open Number 1-205988.

A method for suppressing drift according to the invention of this Japanese application receives a weight effect from the position of a joint in a teaching mode, outputs a torque compensating the weight from a joint actuator to the joint, drives a servo motor and sets a weakness position to the present position of the joint as a target position thereby reducing a load in teaching and suppressing a drift generated from a mechanical transition and weight calculation error in figure arithmetic.

Accordingly, this Japanese invention does not resolve the above problem in that it continuously uses a previously established compensation value if the difference between the destination position and the present position is within the maximum permissible limits.

The object of the invention is to reduce the time to attain to a more efficient operation by accurately compensating for warm-up drift of a position control apparatus in a servo motor.

Another object of the invention is to reset the warm-up drift compensation value even when the difference between the destination position and the present position is within the maximum permissible limits.

Another object of the invention is to reset the warm-up drift compensation value by adding the previous compensation value to a given value in an integral controller every time the servo motor stops.

Therefore, in order to achieve the object, an apparatus according to the present invention reads specific value via a register in an integral controller of a position control apparatus via a register every time that the speed feedback signal is applied to the register, totals said values, transmits a speed feedback signal and a speed command signal output from the PID (Proportional Integral Differentiation) controller and controls the servo motor based on the result of the calculations. It sets an initial warm-up drift compensation value at zero and thereafter resets the warm-up drift compensation value whenever the servo motor comes to a stand still.

A method for compensating for warm-up drift according to the invention comprises the steps of setting an integral limiter so as not to limit the output of the integral controller, initiating a warm-up drift compensation value, setting the warm-up drift compensation value at zero in the initial stopped position of the servo motor, the step of resetting an integral limiter so as not to generate any vibrations in the initial stopping of the servo motor, detecting the present position and determining if there is a difference between it and the destination position, and when the difference is within a maximum permissible limit, controlling a position control apparatus with a reset warm-up drift compensation value, and, when the difference exceeds a maximum permissible limit, setting the integral limiter so as not to limit the output from the integral controller, resetting the warm-up drift compensation value and setting the integral limiter so as not to generate any initial vibration.

DESCRIPTION OF THE PREFERRED EMBODIMENTS

Embodiments of the present invention will be described hereinafter in detail with reference to the accompanying drawings.

Figure 1:
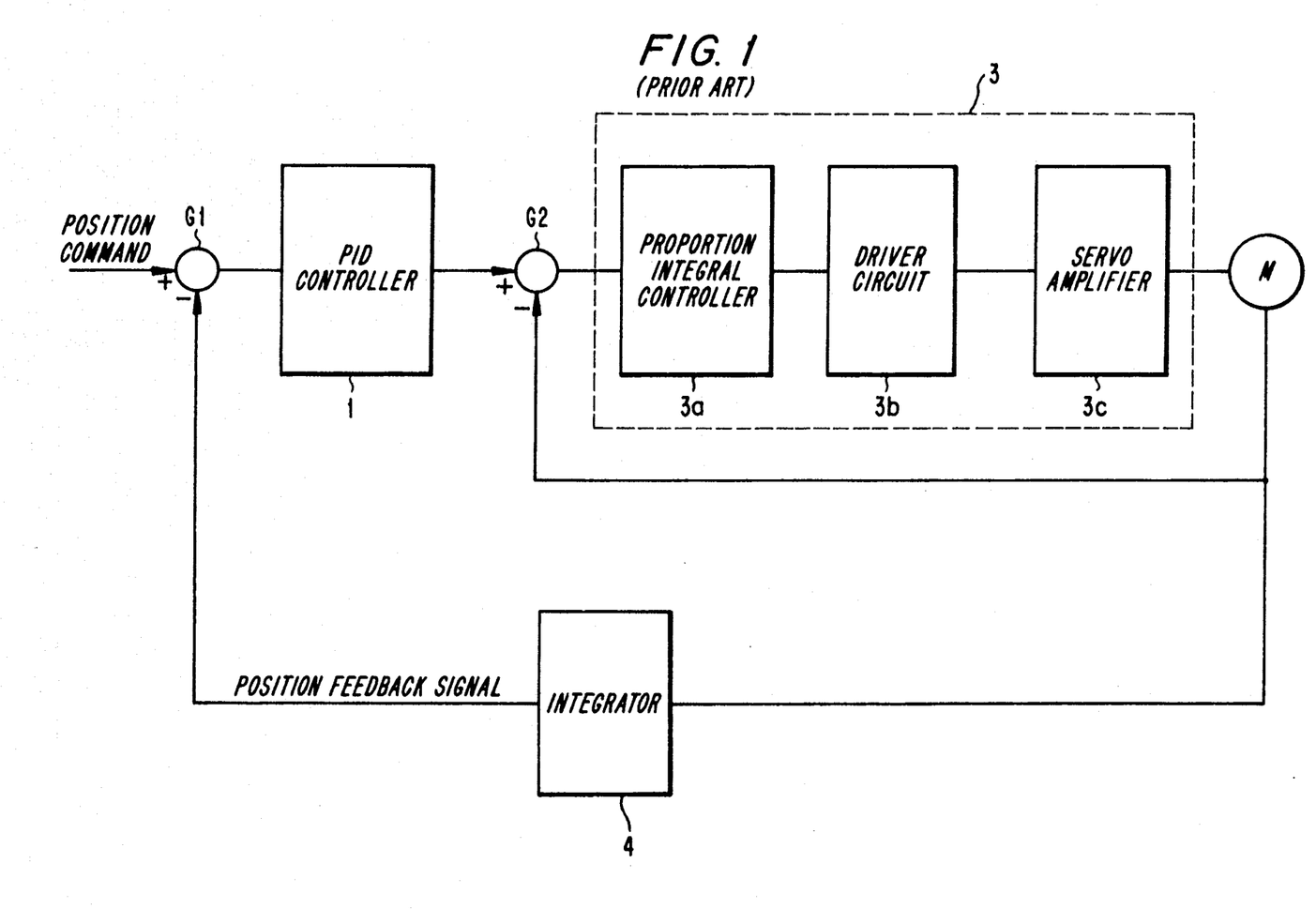
FIG. 1 is a block diagram of a position control apparatus according to the prior art.
Figure 2:
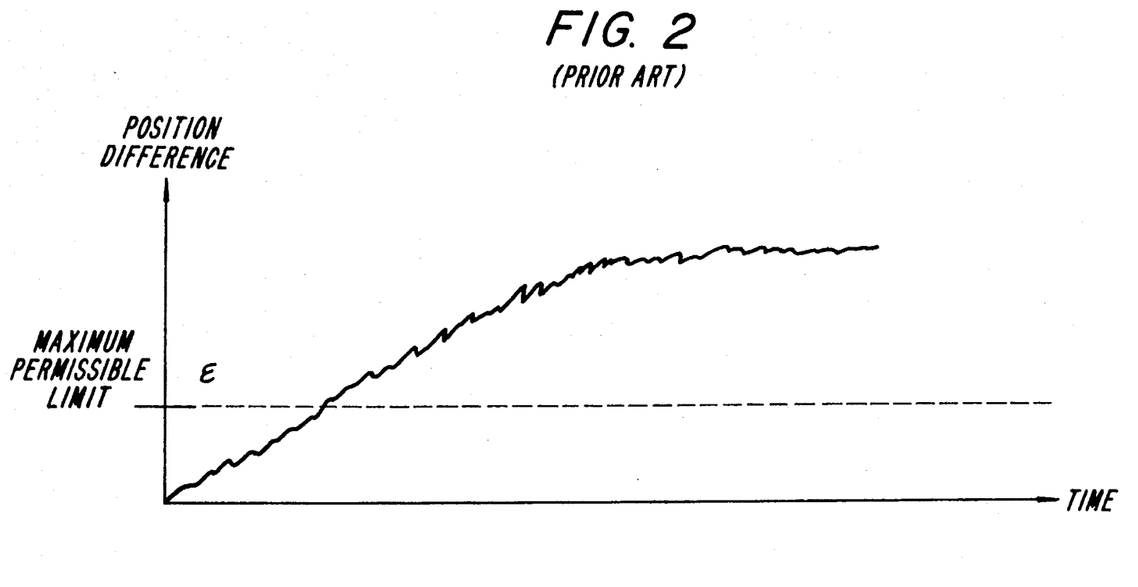
FIG. 2 is a graph showing an initial position difference occurring in the position control apparatus shown in FIG. 1.

FIG. 1 is a block diagram of a conventional position control apparatus. A first arithmetic unit G1 calculates the sum of a position command signal and a position feedback signal. A PID controller 1 converts the calculation to the signal driving the servo motor. A second arithmetic unit G2 receives a feedback signal corresponding to the present speed of the servo motor M and adds it and the speed command signal from the PID controller 1 and then applies the result of the calculated sum to an analog servo 3. The analog servo 3 consists of a proportion-integral controller 3a, a driver circuit 3b and a servo amplifier 3c and it performs a proportion-integral control and operates the servo motor M to result in proportion-integral control. Also, an integrator 4 integrates a present speed signal of the servo motor M, so that it yields a position feedback signal and applies the result to the first arithmetic unit G1. At this point, the first arithmetic unit G1 receives the position feedback signal from servo motor M as detected by a position detection sensor (not shown). FIG. 2 is a graph showing an initial position difference exceeding the maximum permissible limit $\epsilon$ over time according to the position control apparatus of FIG. 1.

Figure 3:
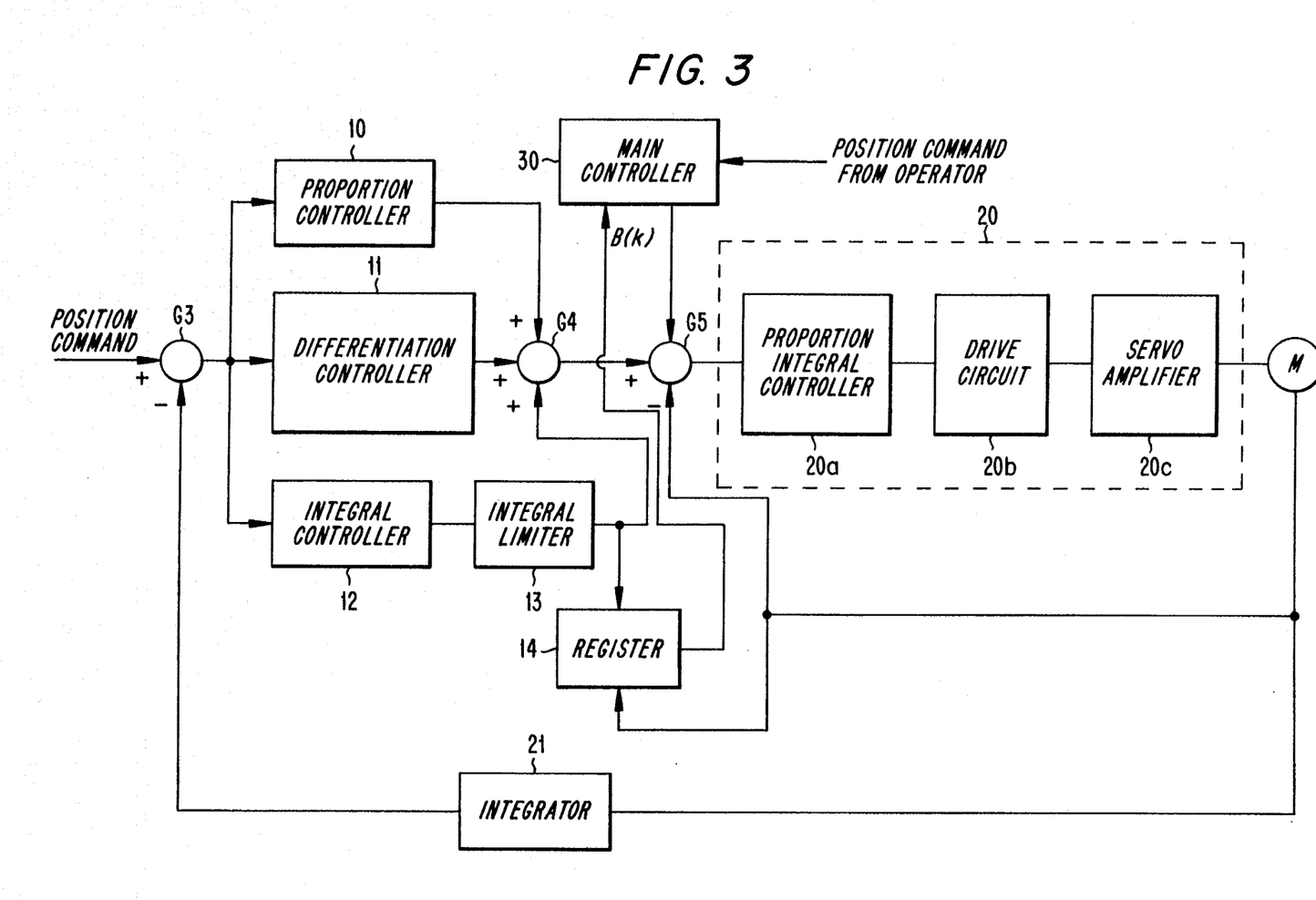
FIG. 3 is a block diagram showing a position control apparatus according to the present invention.

FIG. 3 is a block diagram showing an embodiment of an apparatus according to the present invention.

Figure 4:
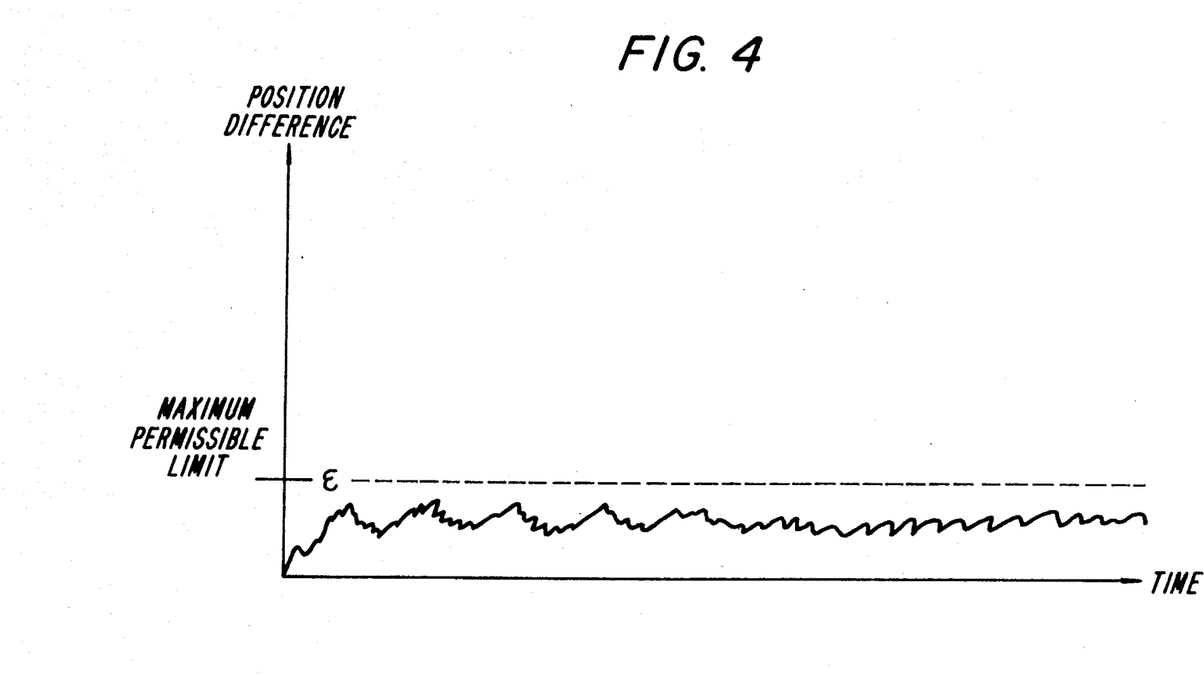
FIG. 4 is a graph showing an initial position difference occurring in the position control apparatus according to the present invention.

In FIG. 3, a first arithmetic unit G3 calculates the sum of the position command signal received from a main controller 30 and the present position signal (that is to say, the present position feedback signal) obtained by integrating the present speed of a servo motor M with integrator 21. A proportion controller 10 transmits a control signal sent from the first arithmetic unit G3 for proportioning the difference between the position command control signal and the present position feedback signal. A differentiation controller 11 calculates the difference obtained from the first arithmetic unit G3 with respect to time and outputs the result. An integral controller 12 integrates the difference calculated from the first arithmetic unit G3 and outputs the result. An integral limiter 13 limits the upper limit value and the lower limit value of the output from integral controller 12 thereby preventing the servo motor M from vibrating while it is at a standstill due to the large integral value. A register 14 continuously reads the output from the integral limiter 13. When a speed feedback signal indicates that the present speed is zero, that is to say, when the register 14 receives a signal indicating that the servo motor M is at a standstill after the kth movement, it transmits the signal B(k) previously received from the integral limiter 13. A second arithmetic unit G4 calculates the sum of the outputs from the proportion controller 10, the differentiation controller 11 and the integral limiter 13 and transmits the result of the calculation as a speed control command signal. A third arithmetic unit G5 calculates the sum of the speed command signal from the second arithmetic unit G4, a speed feedback signal indicating the present speed of the servo motor M and a drift compensation value V(k−1) (here, set V(0=0) obtained at the position after the (k−1)th movement of the servo motor M. An analog servo 20 consists of a proportion and integral controller 20a performing proportional and integral control according to the speed command signal from the third arithmetic unit G5, a drive circuit 20b receiving the output from the proportional integral controller 20a and yielding a signal for driving the servo motor M and a servo amplifier 20c for amplifying the output from the drive circuit 20b. An integrator 21 integrates the speed feedback signal from the servo motor M and transmits the resulting position feedback signal to the first arithmetic unit G3. FIG. 4 illustrates a graph showing in initial position difference which stays below the maximum permissible limit over time using the position control apparatus according to the present invention.

Figure 5A:
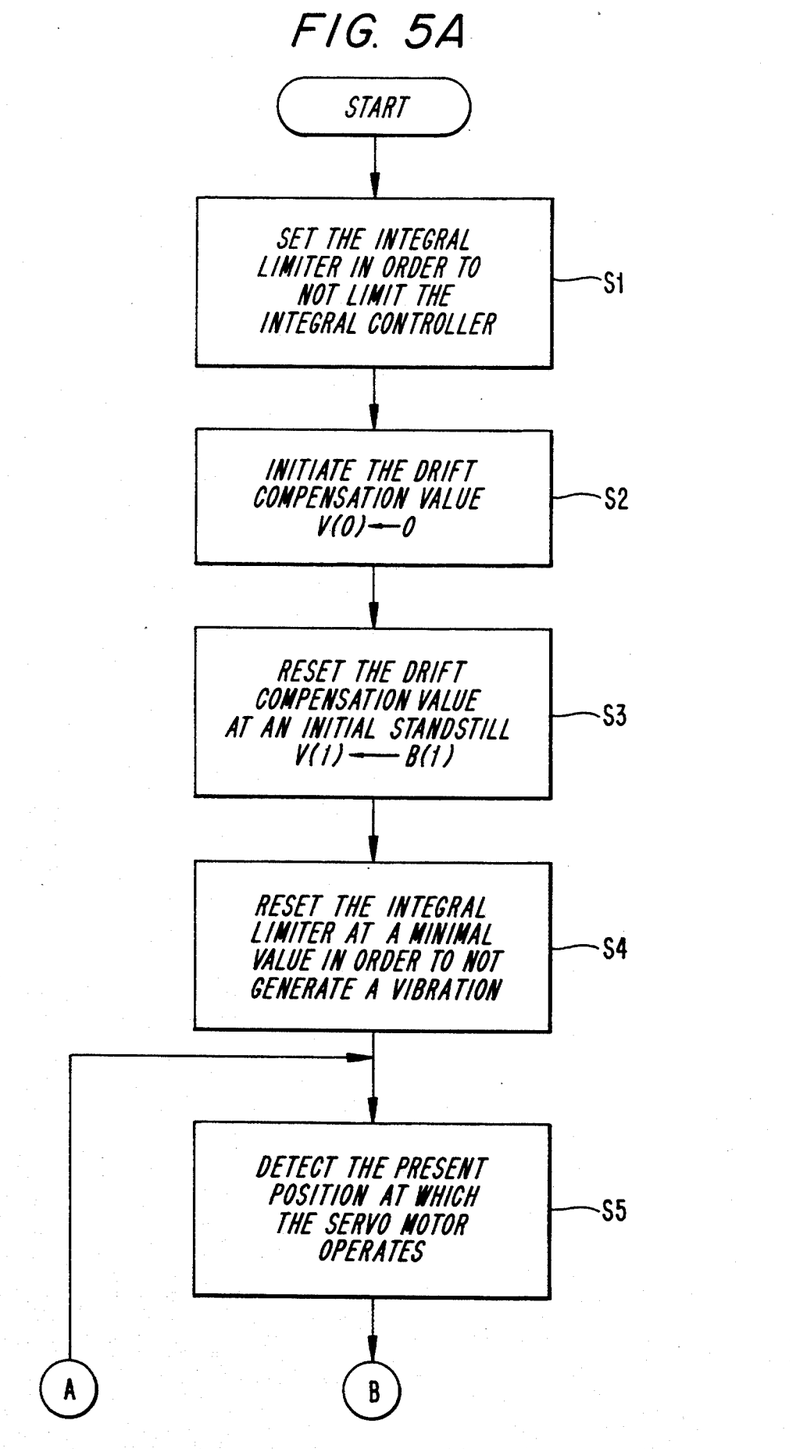
FIG. 5A and FIG. 5B are a flow chart showing a method for compensating for warm-up drift in a servo motor of the position control apparatus according to the present invention.
Figure 5B:
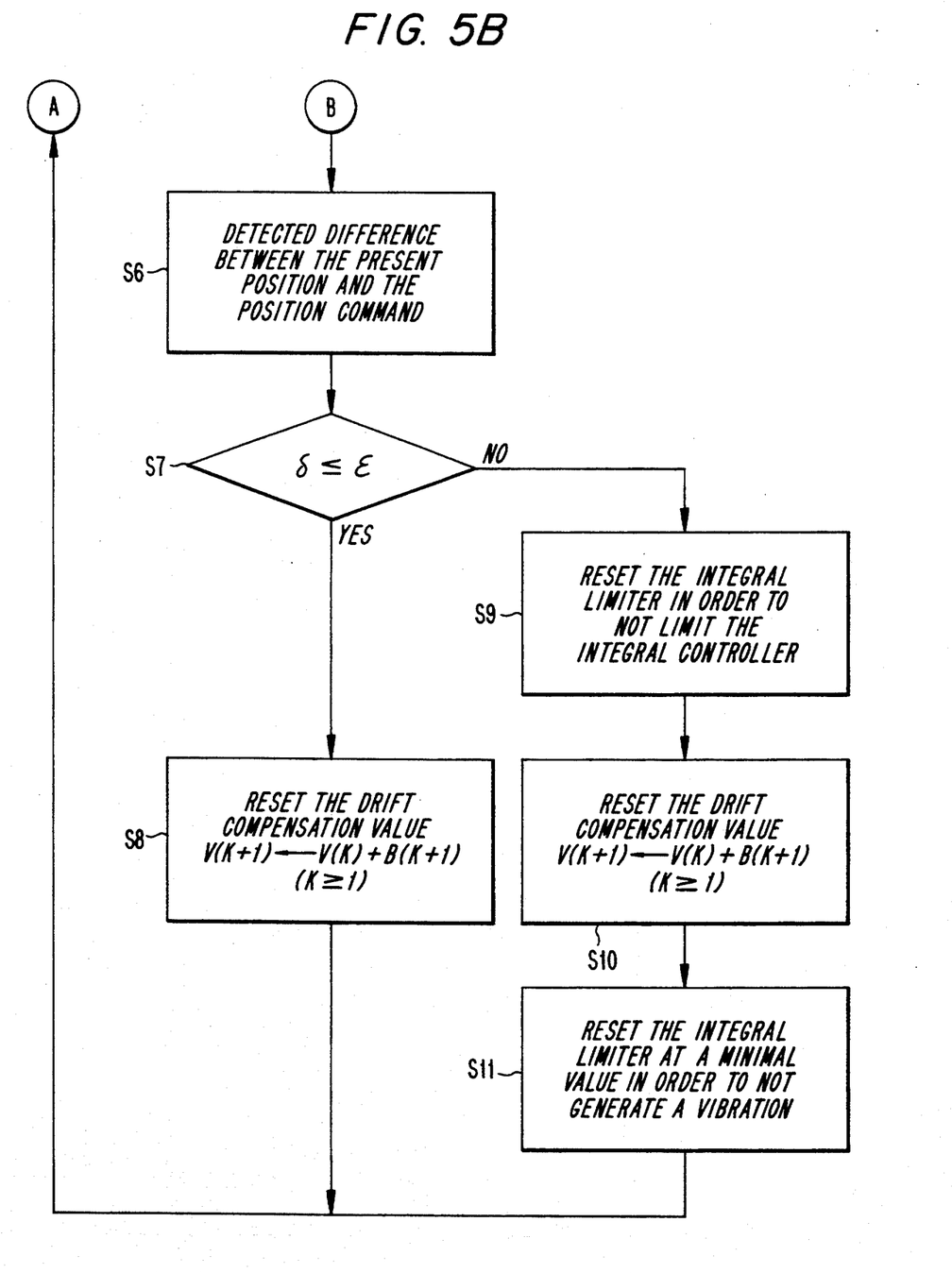

A method for compensating for warm-up drift in the position control apparatus of a servo motor M according to the present invention is hereinafter described in detail with reference to the accompanying drawings FIG. 5A and FIG. 5B.

In step S1, when a driving error occurs during the initial start up phase, the upper limit value and the lower limit value of the integral limiter 13 are set at a minimal value so that the output from the integral controller 12 is not limited so that the position error of the apparatus according to the present invention is within the maximum permissible limits. In step S2, the position control apparatus according to the present invention is initially set with the warm-up drift compensation value at zero (V(0)←)0). In step S3, when the servo motor M is initially at a initial standstill after the power is activated, the warm-up drift compensation value is set at B(1) (V(1)←B(1)). In step S4, the integral limiter 16 is reset at a minimal value so that the position control apparatus does not vibrate while at a standstill. In step S5, the present position to which the servo motor M moves is detected and fed back to the first arithmetic unit G3. In step S6, a difference between the present position and the position command applied from the main controller 30 is detected, that is to say, a difference $\delta$ ($\delta = 1\theta_2 - \theta 1$) between the present position $\theta$ and the destination position $\theta_2$ is calculated. A determination is then made as to whether or not the present difference $\delta$ is within the maximum permissible limits $\epsilon$ (in step S7). When the present difference $\delta$ is within the maximum permissible limits $\epsilon$, the program proceeds to step S8. At step S8, when the servo motor M is at a standstill after the kth movement and the register 14 stores the output from the integral limiter 13 in the register 14, the warm-up drift compensation value is reset by adding the output signal B(k) from the integral limiter 13 to the previous compensation value when the speed feedback signal is transmitted from the servo motor M to the register 14. The program then returns to step S5. That is to say, the difference between the present position and the destination position is calculated whenever the servo motor M is at a standstill. Even if the result is within the maximum permissible limit $\epsilon$, a new drift compensation value is obtained by adding the output B(k) from the integral limiter 13 to the previous drift compensation value. The servo motor M is controlled as a result(step S7 to step S8).

On the other hand, when the present difference exceeds the maximum permissible limits (when the answer is "no" at step S7), the operating precision of the servo motor deteriorates, which causes the operational efficiency of the robot to decline.. The program then proceeds as follows.

The integral limiter 13 is reset at a minimal amount so as not to limit the integral controller 12 in step S9. In step 10, the warm-up drift compensation value is reset in the same manner as at step S8. That is to say, the warm-up drift compensation value is reset by adding the output B(k) from the integral limiter 13 to the previous drift compensation value when the servo motor is at a standstill after the kth movement (V(k+1)←V(k)+B(K+1), k≧1). Thereafter, in step S11, the integral limiter 13 is reset at a minimal value so that the position control apparatus does not vibrate while at a standstill and the PID-controlled position command is compensated with the compensation value as reset in step S10. The servo motor M is controlled by the compensated position command. The program then returns to step S5.

As mentioned above in detail, because an apparatus according to the invention resets the warm-up drift compensation value whenever the servo motor is at a standstill, even when the difference between the destination position and the present position is within the maximum permissible limits after its movement, there is minimal variance during the initial start-up phase.

Therefore, instability from the warm-up drift is minimized, so that additional power is not needed to drive the servo motor at the initial start up phase.

What is claimed is:

1. A method for compensating for warm-up drift in a position control apparatus of a servo motor based on a difference between a position command signal and a position feedback signal, comprising the steps of:
    resetting an integral limiter to avoid limiting an output from an integral controller of a proportional-integral-differential controller;
    initializing a warm-up drift compensation value;
    resetting the warm-up drift compensation value and an integral limiter of the proportional-integral-differential controller to avoid generating vibrations when the servo motor is at an initial standstill; and
    resetting the warm-up drift compensation value whenever the servo motor is at a standstill even if the difference between a destination position and a present position is within a maximum permissible limit.

2. A method for compensating for warm-up drift in a position control apparatus of a servo motor according to claim 1, wherein:
    the step of resetting the warm-up drift compensation value whenever the servo motor is at a standstill comprises the step of resetting a previous value when the difference between the destination position and the present position is within the maximum permissible limit; and
    further comprising, when the difference between the destination position and the present position exceeds the maximum permissible limit, the steps of:
    resetting the integral limiter to avoid limiting the output from the integral controller;
    resetting the warm-up drift compensation value; and
    resetting the integral limiter to avoid generating vibrations when the servo motor is at a standstill.

3. A method for compensating for warm-up drift in a position control apparatus of a servo motor according to claim 1, wherein:
    the warm-up drift compensation value is reset according to the formula $$V(k) = V(k-1) + B(k),$$

where $k > 1$, $V(0) = 0$, and $B(k)$ is the output from the kth standstill.

4. A position control apparatus for controlling a servo motor with a speed command signal yielded at a proportional-integral-differential controller based on a difference between a position command signal and a position feedback signal comprising:
    a register for storing a value in the integral controller from the proportional integral-differential controller whenever the register receives a speed feedback signal;
    a main controller transmitting a warm-up drift compensation value whenever the servo motor is at a standstill; and
    an arithmetic unit for calculating a sum of the warm-up drift compensation value sent from the main controller, a speed command signal, and the speed feedback signal, and applying said sum to said servo motor.

5. A position control apparatus for controlling a servo motor comprising:
    an integrator for generating a speed feedback signal indicating a present speed of the servo motor;
    proportional-integral-differential controller means for generating a speed control command signal;
    an integral limiter for limiting an output of the proportional-integral-differential controller;
    register means for reading an output of said integral limiter, receiving said speed feedback signal, and when said speed feedback signal indicates that the servo motor is at a standstill, transmitting a signal representing the output of said integral limiter;
    means for receiving said signal from said register means and calculating a warm-up drift compensation value whenever the servo motor is at a standstill.

6. A method for compensating for warm-up drift in a position control apparatus of a servo motor comprising the steps of:
    setting an integral limiter so as not to limit output of an integral controller;
    initializing a warm-up drift compensation value;
    resetting the warm-up drift compensation value when the servo motor reaches an initial standstill position;
    resetting the integral limiter so as not to generate vibrations when the servo motor reaches the initial standstill position;
    detecting a present position of the servo motor;
    determining a difference between the detected present position and a destination position;
    if the difference is within a maximum permissible limit, recalculating the warm-up drift compensation value and controlling the position control apparatus in accordance with the recalculated warm-up drift compensation value; and
    if the difference exceeds the maximum permissible limit, resetting the integral limiter so as not to limit output of the integral controller, recalculating the warm-up drift compensation value, and resetting the warm-up drift compensation value so as not to generate vibrations when the servo motor is at a standstill.

7. A method for compensating for warm-up drift in a position control apparatus of a servo motor comprising the steps of:
    setting an integral limiter so as not to limit output of an integral controller;
    initializing a warm-up drift compensation value;
    resetting the warm-up drift compensation value when the servo motor reaches an initial standstill position;
    resetting the integral limiter so as not to generate vibrations when the servo motor reaches the initial standstill position;
    recalculating the warm-up drift compensation value whenever the servo motor is at a standstill.

8. A method for compensating for warm-up drift in a position control apparatus of a servo motor according to claim 7, wherein:
    the step of recalculating the warm-up drift compensation value whenever the servo motor is a standstill comprises the step of resetting a previous compensation value when a difference between a destination position and a present position is within a maximum permissible limit; and
    further comprising the steps of:

determining a difference between a destination position and a present position; and when the difference between the destination position and the present position exceeds the maximum permissible limit;

resetting the integral limiter so as not to limit the output from the integral controller;

resetting the warm-up drift compensation value; and resetting the integral limiter so as not to generate vibrations when the servo motor is at a standstill.

9. A method for compensating for warm-up drift in a position control apparatus of a servo motor based on a difference between a position command signal and a position feedback signal, comprising the steps of:

resetting an integral limiter to avoid limiting output from an integral controller of a proportional-integral-differential controller;

initializing a warm-up drift compensation value;

resetting the warm-up drift compensation value and an integral limiter of the proportional-integral-differential controller to avoid generating vibrations when the servo motor is at an initial standstill; and resetting the warm-up drift compensation value whenever the servo motor is at a standstill;

wherein the step of resetting the warm-up drift compensation value whenever the servo motor is at a standstill comprises the step of resetting a previous value when a difference between a destination position and a present position is within a maximum permissible limit; and further comprising, when the difference between the destination position and the present position exceeds the maximum permissible limit, the steps of:

resetting the integral limiter to avoid limiting the output from the integral controller;

resetting the warm-up drift compensation value; and resetting the integral limiter to avoid generating vibrations when the servo motor is at a standstill.

* * * * *